(12) United States Patent
Ohmi et al.

(10) Patent No.: US 6,375,911 B1
(45) Date of Patent: Apr. 23, 2002

(54) METHOD AND DEVICE FOR TREATING EXHAUST GAS

(75) Inventors: Tadahiro Ohmi, Miyagi; Yoshio Ishihara, Tokyo; Koh Matsumoto, Tokyo; Tetsuya Kimijima, Tokyo, all of (JP)

(73) Assignee: Nippon Sanso Corporation, Tokyo (JP)

(*) Notice: Subject to any disclaimer, the term of this patent is extended or adjusted under 35 U.S.C. 154(b) by 0 days.

(21) Appl. No.: 09/355,937

(22) PCT Filed: Dec. 11, 1998

(86) PCT No.: PCT/JP98/05611

§ 371 Date: Aug. 13, 1999

§ 102(e) Date: Aug. 13, 1999

(87) PCT Pub. No.: WO99/30809

PCT Pub. Date: Dec. 11, 1998

(30) Foreign Application Priority Data

Dec. 15, 1997 (JP) ............................. 9-345047

(51) Int. Cl.⁷ .................. B01D 53/86; B01D 53/46; B01J 23/74
(52) U.S. Cl. .............. 423/240 S; 423/342; 423/481; 423/488; 422/171; 422/173; 422/103; 422/104; 422/198; 422/199
(58) Field of Search ............... 423/240 S, 342, 423/348, 350, 481, 488, 240 R; 422/171, 173, 103, 104, 198, 199

(56) References Cited

U.S. PATENT DOCUMENTS

| | | | | | |
|---|---|---|---|---|---|
| 2,595,620 | A | * | 5/1952 | Wagner et al. | 423/342 |
| 3,933,985 | A | * | 1/1976 | Rodgers | 423/350 |
| 4,515,762 | A | * | 5/1985 | Griesshammer et al. | 423/337 |
| 4,526,769 | A | * | 7/1985 | Ingle et al. | 423/342 |
| 5,378,444 | A | * | 1/1995 | Akita et al. | 423/240 S |
| 5,401,872 | A | * | 3/1995 | Burgie et al. | 423/342 |
| 5,716,590 | A | * | 2/1998 | Roewer et al. | 423/350 |
| 6,030,591 | A | * | 2/2000 | Tom et al. | 423/240 S |
| 6,060,034 | A | * | 5/2000 | Tsukamoto | 423/240 S |

FOREIGN PATENT DOCUMENTS

| | | | | |
|---|---|---|---|---|
| JP | 46-15766 | * | 4/1971 | 423/481 |
| JP | 57-170804 | * | 10/1982 | 423/481 |
| JP | 59-193522 | | 12/1984 | |
| JP | 61-90726 | | 5/1986 | |
| JP | 63-200820 | | 8/1988 | |
| JP | 5-269339 | | 10/1993 | |
| JP | 8-141359 | | 6/1996 | |

* cited by examiner

*Primary Examiner*—Ngoc-Yen Nguyen
(74) *Attorney, Agent, or Firm*—Armstrong, Westerman & Hattori, LLP

(57) ABSTRACT

A process and an apparatus for treating an exhaust gas, in which a raw gas and high-boiling intermediate products contained in the exhaust gas let out from a CVD system employing a silicon-containing gas is brought into contact with a transition metal such as nickel or a silicide of such transition metals to decompose or convert them into stable halides, followed by detoxication treatment of the harmful components contained in the exhaust gas.

5 Claims, 4 Drawing Sheets

METHOD AND DEVICE FOR TREATING EXHAUST GAS

TECHNICAL FIELD

The present invention relates to a process and an apparatus for treating an exhaust gas, more particularly to a process and an apparatus for detoxicating an exhaust gas let out from a chemical vapor deposition (CVD) system for forming silicon epitaxial films, polycrystalline films or amorphous films using silicon-containing gases (silane halide gases) in a semiconductor manufacturing process. The silicon-containing gases refer to halogenosilane gases such as trichlorosilane (TCS: $SiHCl_3$) and dichlorosilane (DCS: $SiH_2Cl_2$), and silicon halide gases such as silicon tetrachloride.

BACKGROUND ART

The epitaxial (single crystal growth) process, which is a silicon CVD process, is employed for preparation of substrates for field-effect MOS (metal-oxide-semiconductor) transistors or for formation of emitter layers in bipolar transistors. The epitaxial process is generally carried out by using as a raw gas a silicon-containing gas such as TCS and DCS which is diluted with hydrogen before introduction into a process chamber and by heat-decomposing the raw gas by heating the substrate placed in the process chamber to about 1100° C. to effect deposition of silicon on the substrate. The above process is generally carried out under a pressure conditions of atmospheric to 100 Pa (Pascal).

Meanwhile, the polycrystal growth process is employed for forming gate electrodes of field effect MOS (metal oxide semiconductor) transistor and ground layers for capacitors. In the polycrystal growth process, a silicon-containing gas such as TCS and DCS is diluted with hydrogen, and the thus diluted gas is introduced into a process chamber in which a substrate heated to about 800° C. is loaded to effect heat decomposition of the raw gas to achieve deposition of silicon on the substrate. This processing is usually carried out under a vacuum condition of about 100 Pa.

Further, in such processes, for the purpose of control of moisture to be adsorbed by wafers as they are loaded in and out of the process chamber, a moisture monitor (an optical analyzer for optical measurement; e.g., Fourier Transform infrared (FTIR) spectrophotometer) is occasionally attached to an exhaust piping system.

In such crystal growth process as described above, the amount of the raw gas which is introduced into the process chamber for the purpose of silicon deposition and which contributes actually to the deposition of silicon on the substrate is about 5%, and the most of the rest of the raw gas is exhausted without contribution together with intermediate products (about several % of the total amount) from the chamber. The exhaust gas let out from the chamber is detoxicated by a detoxicating unit which removes the raw gas and intermediate products, and only hydrogen as the carrier gas and nitrogen as the purge gas are released into the atmosphere.

In the epitaxial process, however, there is a problem that intermediate products (by-products) formed during the process adhere or deposit on the inner wall surface of the exhaust piping to be likely to cause clogging of the exhaust piping with the deposit. Further, light transmitting windows of optical analyzers are tarnished with the deposit to make it sometimes difficult to carry out accurate measurement. Such intermediate products include compounds of silicon and chlorine or of silicon and hydrogen, and these compounds form polymers at room temperatures on the inner wall surface of the exhaust piping. The polymers formed are converted to highly reactive (self ignitable or explosive) materials, for example, polysiloxanes, by the moisture contained in the atmosphere. Accordingly, when the exhaust piping is disassembled to be open to the atmosphere in order to remove the polymers deposited on the inner wall surface of the exhaust piping, various preparations and contrivances are required, being causative of dropping the operation efficiency of the CVD system.

Meanwhile, it is practiced to feed an etching gas such as chlorine trifluoride ($ClF_3$) into the exhaust piping in order to prevent deposition of the polymers. It is true, however, that the intermediate products deposited on the inner wall surface of the piping can be removed according to this method, but the method involves a problem in that the exhaust piping itself is corroded by the strong etching property of the etching gas or the etching gas can even cause formation of holes in the piping.

Further, the etching gas such as $ClF_3$ and the raw gas employed in the epitaxial process cannot usually be treated by a single detoxicating unit, so that a plurality of detoxicating units must be used selectively depending on which gas is fed.

On the other hand, there is proposed a method in order to prevent intermediate products from adhering or depositing on the exhaust piping to heat the piping constantly to a temperature of about 150° C. According to this method, however, if the temperature of the piping is low at some parts, the intermediate products deposit selectively to such low-temperature parts. The piping between the detoxicating unit and the CVD system usually contains complicated bends from the requirement of reducing the installation area, and it is difficult to heat or heat-insulate the piping uniformly. Actually, maintenance of the piping has been carried out by disassembling the piping to remove the intermediate products deposited at the low-temperature portions.

While a scrubber employing water is frequently used for detoxication of TCS or DCS, solid silicon dioxide ($SiO_2$) is formed by the reaction between water and TCS or DCS, so that the circulation water employed in the scrubber is provided with means for removing $SiO_2$. However, since the thus removed $SiO_2$ contains hydrogen, it cannot be exhausted as such. Thus, it has been practiced to carry out treatment of $SiO_2$ by reacting it with hydrogen fluoride (HF). Since these procedures are carried out as periodical maintenance of the detoxicating unit, not only the operation rate of the CVD system is lowered, but also chemical agents for removing the $SiO_2$ formed, personnel, etc. cost additionally.

DISCLOSURE OF THE INVENTION

It is an objective of the present invention to provide a process and an apparatus for treating an exhaust gas, which can reduce or eliminate periodical maintenance of the exhaust piping and detoxicating units by converting the raw gas employed in the crystal growth process or to highly volatile halides and exhausting the thus obtained halides to the detoxicating unit or a recovery unit without causing adhesion or deposition of the intermediate products in the exhaust piping system.

In order to attain the above objective, in the process for treating an exhaust gas let out from a CVD system for forming a silicon film using a silicon-containing gas according to the present invention, an unreacted raw gas and an intermediate product contained in the exhaust gas are subjected to a decomposition or conversion reaction treatment, and then harmful components contained in the exhaust gas are detoxicated. The decomposition or conversion reaction treatment is carried out by bringing the exhaust gas into contact with a transition metal or a transition metal silicide heated to 400° C. or higher. Further, the decomposition or conversion reaction treatment is carried out after addition of hydrogen gas to the exhaust gas.

The apparatus for treating an exhaust gas let out from a CVD system for forming a silicon film using a silicon-containing gas according to the present invention is provided with decomposition reaction means for carrying out decomposition or conversion reaction of an unreacted raw gas and an intermediate product contained in the exhaust gas; detoxicating means for detoxicating harmful components contained in the exhaust gas let out from the decomposition reaction means; and means for heating or maintaining an exhaust gas passage from the CVD system to the decomposition reaction means to or at a predetermined temperature. The exhaust gas passage is provided with hydrogen gas adding means for adding hydrogen gas to the exhaust gas. The decomposition reaction means is provided with a reactor packed with a transition metal or a transition metal silicide and means for heating the transition metal or transition metal silicide to a predetermined temperature.

According to the present invention, since the unreacted raw gas and the like can be decomposed or converted into hydrogen chloride (HCl) which can be treated easily, no deposit is formed on the inner wall surface of the piping, and further the periodical maintenance of removing deposit becomes unnecessary, improving operation rate of the CVD system. Further, since no $SiO_2$ is formed during the detoxication treatment, the load to be applied to the unit in the detoxicating treatment is reduced and the mechanism for removing $SiO_2$ having been installed conventionally becomes unnecessary, resulting in curtailment of the cost of the detoxication treating unit. Further, cleaning of the exhaust piping using $ClF_3$ becomes unnecessary, and thus the cost required for the cleaning can be reduced, and also the exhaust piping can be simplified. In addition, no damping of light occurs when monitored using an optical measuring unit installed in the exhaust piping, so that accurate measurement can be performed and that maintenance of the optical windows in measuring instruments can be eliminated.

BEST MODE FOR CARRYING OUT THE INVENTION

Figure 1:
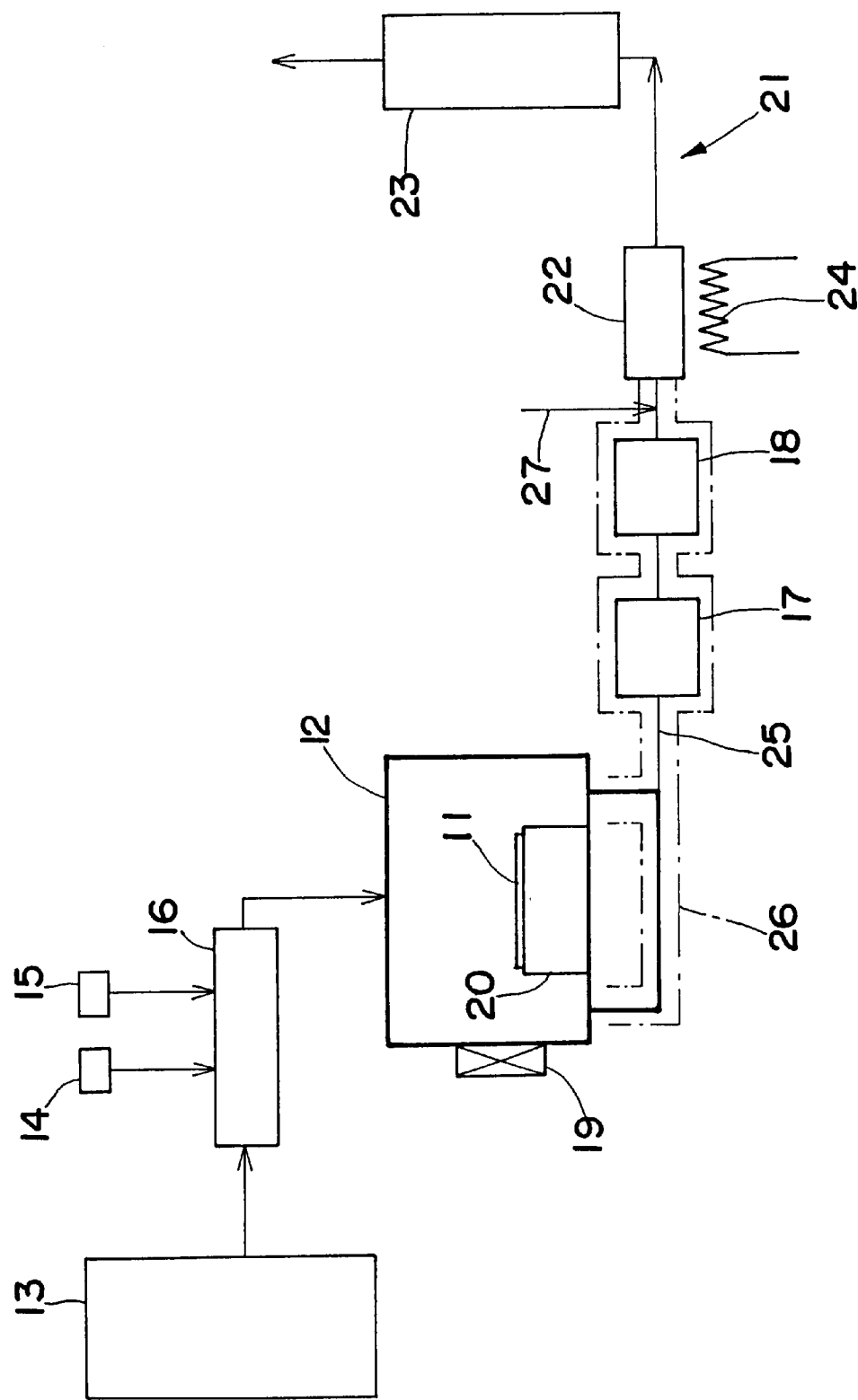
FIG. 1 is a system diagram showing an embodiment where the apparatus for treating an exhaust gas according to the present invention is applied to a CVD system.

FIG. 1 is a system diagram showing an embodiment where the apparatus for treating an exhaust gas according to the present invention is applied to a CVD system. This CVD system, which is a so-called single-wafer-processing resistance heating silicon epitaxial system, is equipped with a process chamber 12 for loading substrates (wafers) 11, a raw gas source 13 for supplying a raw gas, or a cleaning gas into the chamber 12, an atmospheric gas source 14 for supplying an atmospheric gas for maintaining a predetermined atmosphere in the process chamber 12, a purge gas source for supplying a purge gas into the chamber 12, a gas supplying system 16 for controlling flow rates of these gases and the like, and pumps for exhausting the gas from the process chamber 12 (a turbo-molecular pump 17 and a dry pump 18). The atmospheric gas is the same as the carrier gas for carrying the raw gas.

The process chamber 12 is juxtaposed to a loading chamber (not shown) via a gate valve 19. The process chamber 12 is provided with a heating equipment (not shown) for heating a susceptor 20 for loading the wafer 11 and the wafer 11 itself to a predetermined temperature.

In an exhaust system piping 21 including the pumps 17 and 18, a reactor 22 and a detoxicating unit 23 are juxtaposed. The former is means for carrying out decomposition or conversion reaction of the unreacted raw gas and high-boiling intermediate products contained in the exhaust gas, and the latter is means for carrying out detoxication treatment of harmful components contained in the exhaust gas.

This CVD system carries out epitaxial treatment of wafers, while the process chamber 12 is maintained to have an internal pressure of 1 atm under flow of raw gas diluted with a diluent gas and under exhaustion. To describe, for example, a typical sequence for carrying out p-type epitaxial growth, a wafer 11 is introduced through the gate valve 19 into the process chamber 12 to be loaded on the susceptor 20 under flow of a purge gas nitrogen at a flow rate of 2 l/min. After the gate valve 19 is closed, the feed gas is switched from the nitrogen gas to hydrogen gas (atmospheric gas) of 15 l/min to provide a hydrogen atmosphere in the process chamber 12, and also the wafer 11 is heated to 1200° C.

After a wafer planarization treatment at 1200° C. in an atmosphere of 1 atm hydrogen atmosphere for 30 seconds, the wafer heating temperature was lowered to 1150° C. and supply of an epitaxial reaction gas under the 1 atm condition was started to carry out a treatment for 90 seconds. As the epitaxial reaction gas, a mixed gas of a gas containing 15 g/min of TCS in 7 l/min of hydrogen and a gas containing 150 cc/min of diborane in 14.6 l/min of hydrogen is used. Incidentally, when DCS is used in place of TCS, DCS is supplied at a rate of 10 g/min, while the wafer heating temperature is changed to 1080° C. Further, when an n-type epitaxial growth layer is to be formed in place of p-type epitaxial growth layer, phosphine is supplied in place of diborane (at the same flow rate as that of diborane).

After completion of the treatment, the feed gas is switched from the epitaxial reaction gas to 10 l/min of nitrogen gas, and the treated wafer is unloaded. Next, the feed gas is switched to a mixed gas of nitrogen gas and hydrogen chloride gas. While the mixed gas is supplied at a rate of 7 to 15 l/min to maintain the mixed gas atmosphere in the processing chamber, the matters adhered or deposited in the process chamber are removed with the temperature and pressure being maintained at 1150° C. and 1 atm respectively.

Finally, the feed gas was switched again to 10 l/min of nitrogen gas, and the internal temperature of the process chamber is lowered to around room temperature. Thus, a cycle of treatment process is completed and returns to the first step of wafer loading.

According to the sequence as described above, gases of various components are exhausted depending on the step to the exhaust piping 21 to flow into the reactor 22. While the reactor 22 is to carry out decomposition or conversion reaction of the unreacted raw gas and intermediate products contained in the exhaust gas and can treat them suitably depending on the components of the gas to be treated, it is preferred that the reactor 22 is packed with a transition metal catalyst such as of iron (Fe), nickel (Ni), platinum (Pt), palladium (Pd), titanium (Ti), tungsten (W), tantalum (Ta), copper (Cu) or a silicide of such transition metals and that the metal is heated to 400° C. or higher.

As a heating equipment 24 for heating the catalyst, any heater such as an electric heater can be used. The heating temperature to be provided by this heating equipment 24, which may depend on the subject component or the catalyst employed, is usually 400° C. or higher, for example, 400 to 500° C., suitably. Meanwhile, the catalyst can be heated to the critical temperature which depends on the material constituting the reactor 22, heat resistance of the catalyst, etc. However, there is obtained small effect of improving treating efficiency even if the catalyst is heated to such high temperatures unnecessarily, leading merely to loss of energy. Meanwhile, some catalysts can cause dissociation of HCl formed to generate active hydrogen radical and accelerate embrittlement of the material constituting the reactor 22, when they are heated to 500° C. or higher.

Further, in view of maintenance (replacement or activation of catalysts) etc. of the reactor 22, it is desirable to install a plurality of reactors 22 in parallel and to be used switchably. It is also preferred that the discharge piping up to the reactor 22, i.e. an exhaust gas passage 25 from the outlet of the process chamber 12 and through the pumps 17 and 18 to the reactor 22, is provided with a heating equipment 26 and the like and is heated to a suitable temperature, for example about 150° C. so as to prevent deposition from occurring in the passage. However, since the gas temperature in the process chamber 12 is high, the passage 25 need not be wound with a high-capacity heater, but it is sometimes good enough to wind the passage 25 with a heat-insulating material and keep the temperature of the passage 25 by it. Accordingly, a suitable heating or heat-insulating equipment may be used depending on the length, material, etc. of the exhaust gas passage, and such equipment can be omitted in the case where the exhaust gas passage is short to allow flowing of a gas having a sufficient temperature into the reactor 22.

When an exhaust gas from a CVD system is introduced to the reactor 22 having such constitution, TCS, DCS and by-products ($Si_xCl_y$) per se are reacted to be decomposed or converted to other substances. The greatest part of chlorine (Cl) is converted to HCl, whereas Si is bonded to the transition metal catalyst or forms a highly volatile halide, such as silicon tetrachloride ($SiCl_4$). Likewise, boron (B) and phosphorus (P) in diborane and phosphine are removed by bonding to the catalyst.

While hydrogen is necessary in such reactions, there is no inconvenience for the reactions to take place, since TCS and DCS per se contain hydrogen and since hydrogen is used as the atmospheric gas or diluent gas in the usual epitaxial treatments, facilitating decomposition into HCl. However, in the cases where there is a lack of hydrogen in the exhaust gas, for example, when plasma is used for assisting the growth reaction, a hydrogen gas adding equipment (passage) 27 may be attached to an exhaust gas passage 25 on the upstream side of the reactor 22 to supply an adequate amount of hydrogen to it. Particularly, decomposition or conversion of $SiCl_4$ formed can fully be carried out by maintaining the amount of hydrogen suitably, allowing only HCl, which can be treated extremely easily, to be contained as the toxic component in the gas flowing out of the reactor 22. Further, similar effects can be exhibited even when the reactor 22 is interposed between the process chamber 12 and the pump 17, or between the pump 17 and the pump 18.

As described above, since the decomposition or conversion reaction of the unreacted raw gas and by-products contained in the exhaust gas carried out in the reactor 22 eliminates presence of TCS, DCS, by-products, etc. on the downstream side infra of the reactor 22, there occurs neither adhesion nor deposition of such gas components as far as the detoxicating unit 23, and HCl and $SiCl_4$ formed in the reactor 22 can easily be removed from the exhaust gas by absorption in water in the detoxicating unit 23. Further, HCl can be recovered by adding an HCl recovering function to the detoxicating unit 23 to reutilize it in the step of removing the matters adhering or deposited in the process chamber and the like.

TEST EXAMPLE 1

In a system of the constitution as illustrated in FIG. 1, an FTIR was attached to the downstream side of the reactor 22 packed with a nickel catalyst, and components of the gas flowing out of the reactor 22 were analyzed. While film-forming treatment was carried out under feeding of a sample nitrogen gas containing 2300 ppm of TCS to the CVD system, the heating temperature of the reactor was elevated with time to measure changes in the components in the gas flowing out of the reactor. The results are shown in FIG. 2.

Figure 2:
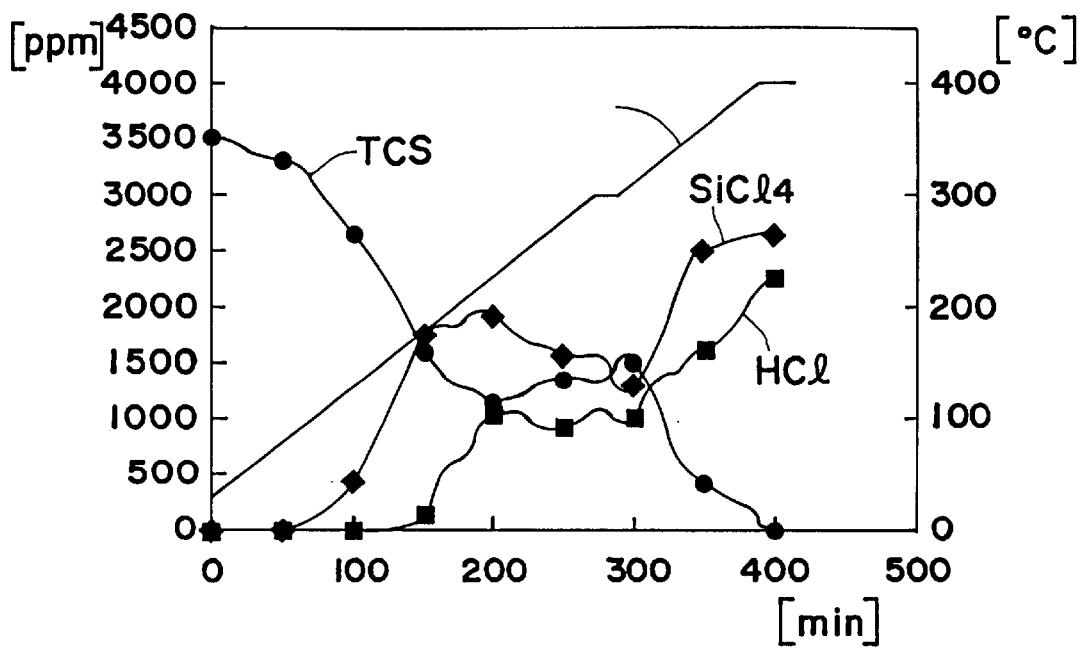
FIG. 2 is a chart showing results of gas component measurement in Test Example 1.

As is clear from FIG. 2, TCS was decomposed completely at 400° C. to form HCl and $SiCl_4$. Meanwhile, no by-product ($SiCl_2$) having low volatility and high reactivity was detected.

TEST EXAMPLE 2

Figure 3:
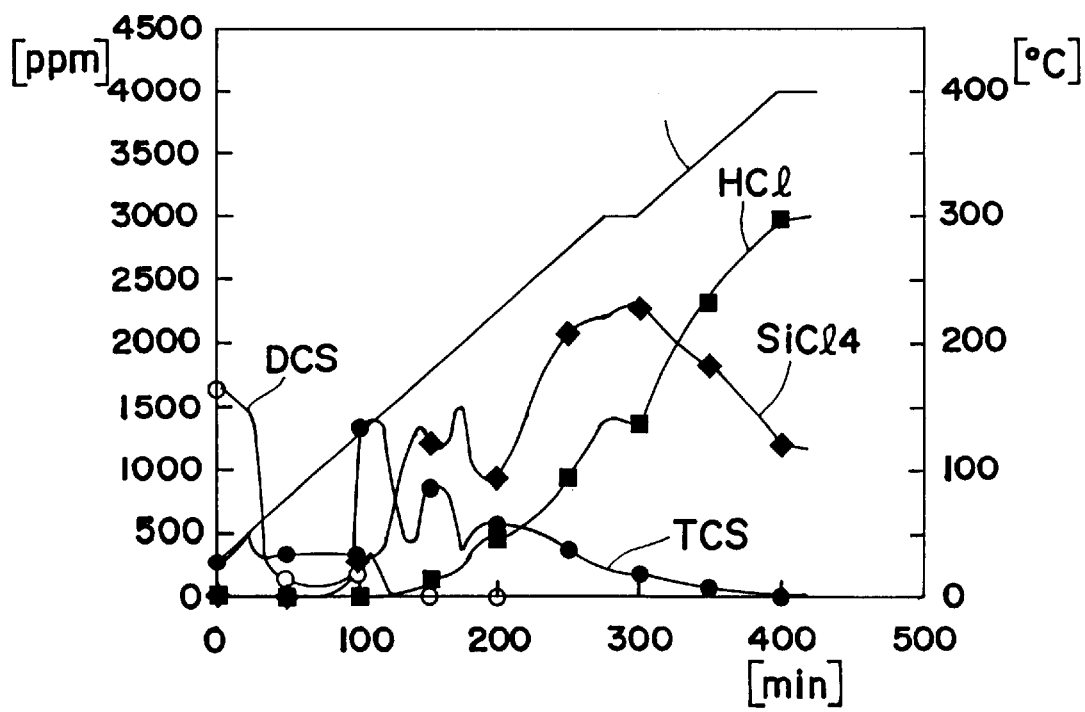
FIG. 3 is a chart showing results of gas component measurement in Test Example 2.

In the system as shown in FIG. 1, the procedures of Test Example 1 were repeated analogously, except that the sample gas was replaced by a nitrogen gas containing 2000 ppm of DCS. Consequently, DCS was decomposed fully at about 150° C. and TCS formed from DCS was also decomposed at about 360° C., as shown in FIG. 3. What were detected at 400° C. were HCl and $SiCl_4$. Here again, no by-product was detected.

TEST EXAMPLE 3

Figure 4:
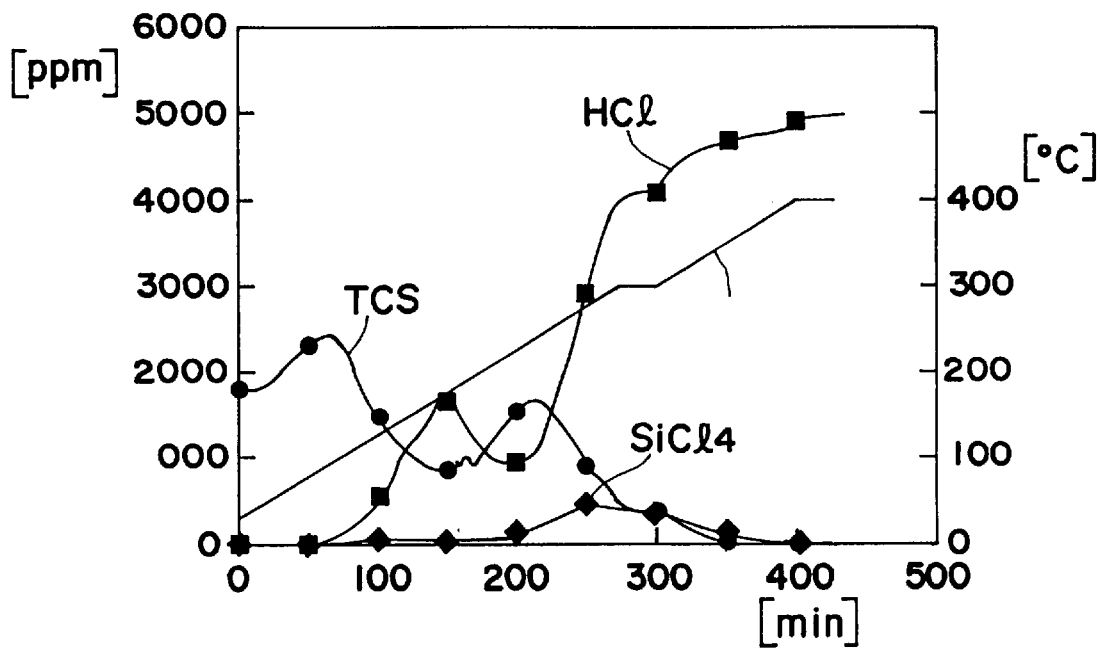
FIG. 4 is a chart showing results of gas component measurement in Test Example 3.

In the system as shown in FIG. 1, the procedures of Test Example 1 were repeated analogously, except that hydrogen gas was added to the sample gas used in Test Example 1. The results are shown in FIG. 4. It can be understood from the results that TCS decomposes fully at about 350° C. and that $SiCl_4$ also decomposes at about 400° C. to form HCl only. Here again, no by-product was detected.

TEST EXAMPLE 4

Figure 5:
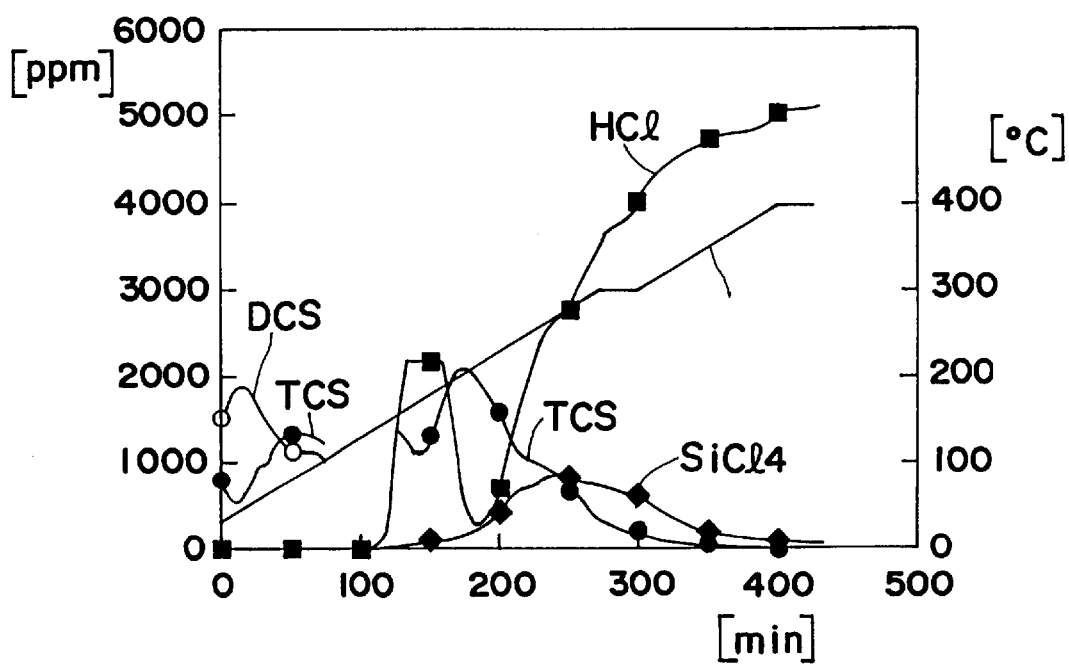
FIG. 5 is a chart showing results of gas component measurement in Test Example 4.

In the system as shown in FIG. 1, the procedures of Test Example 2 were repeated analogously, except that hydrogen gas was added to the sample gas used in Test Example 2. Consequently, as shown in FIG. 5, it can be understood that DCS decomposes fully at about 150° C. and TCS formed from DCS decomposes at about 360° C., that $SiCl_4$ formed also decomposes at about 400° C., and that what is formed finally as a residue is HCl only. Here again, no by-product was detected.

TEST EXAMPLE 5

Figure 6:
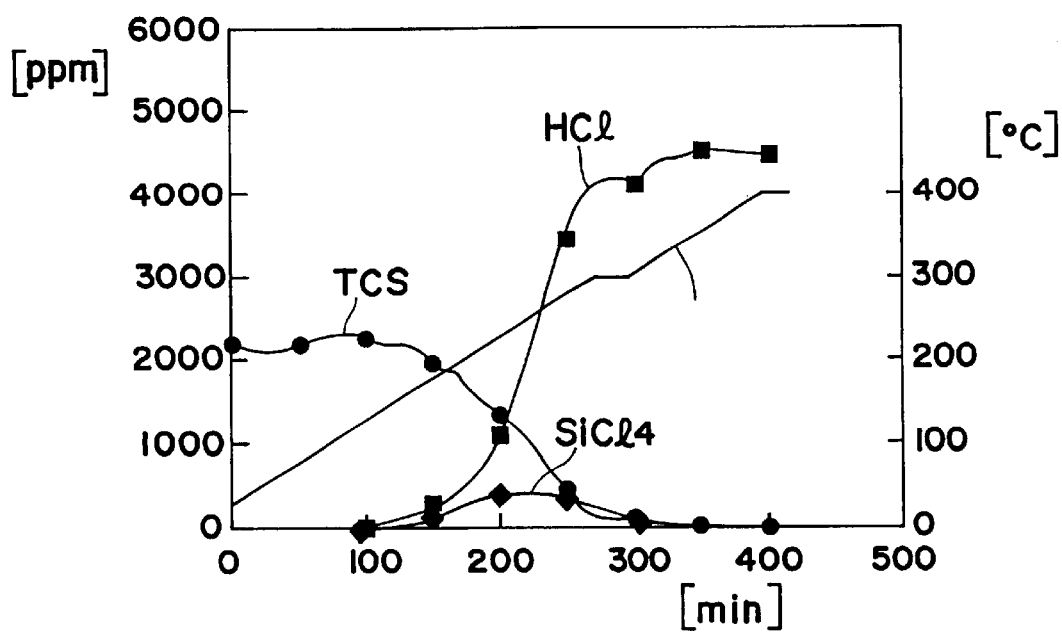
FIG. 6 is a chart showing results of gas component measurement in Test Example 5.

In the system as shown in FIG. 1, the procedures of Test Example 3 were repeated analogously, except that the nickel packed into the reactor 22 was replaced with nickel silicide. Consequently, TCS and $SiCl_4$ were decomposed fully at about 350° C. to form HCl only, as shown in FIG. 6. Here again, no by-product was detected.

TEST EXAMPLE 6

Figure 7:
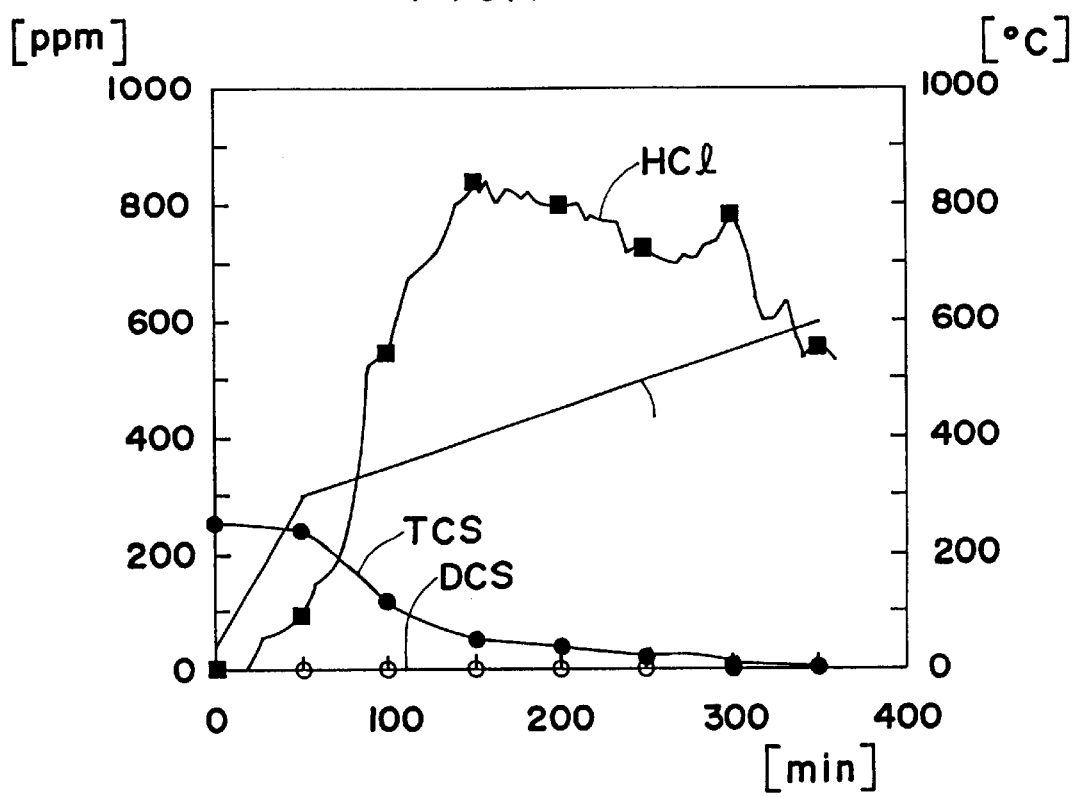
FIG. 7 is a chart showing results of gas component measurement in Test Example 6.

In the system as shown in FIG. 1, the procedures of Test Example 1 were repeated analogously, except that an argon gas containing 250 ppm of TCS was supplied to the reactor 22 packed with an iron catalyst. It should be noted here that the upper limit temperature of the reactor was 600° C. The results are as shown in FIG. 7. As shown clearly in FIG. 7, TCS started decomposing from at about 300° C. and decomposed fully at about 500° C. No DCS was formed, and only HCl was detected.

In each of the above test examples, the amount of light transmitted through the light transmission window of the FTIR unit was measured, and there was observed no drop in the amount of light transmission at all.

What is claimed is:

1. A process for treating an exhaust gas let out from a CVD system for forming a silicon film using trichlorosilane and dichlorosilane, the process comprising:

subjecting unreacted trichlorosilane and dichlorosilane and an intermediate product contained in the exhaust gas to a decomposition treatment, the decomposition is carried out by bringing the exhaust gas into contact with heated transition metal or a transition metal silicide to form hydrogen chloride; and detoxicating harmful components contained in the exhaust gas after the decomposition.

2. The process for treating an exhaust gas according to claim 1, wherein the transition metal or the transition metal silicide is heated to 400° C. or higher.

3. The process for treating an exhaust gas according to claims 1 or 3, wherein the decomposition treatment is carried out after addition of hydrogen gas to the exhaust gas.

4. An apparatus for treating an exhaust gas let out from a CVD system for forming a silicon film using trichlorosilane and dichlorosilane, the apparatus comprising:

decomposition reaction means for carrying out a decomposition reaction of unreacted trichlorosilane and dichlorosilane and an intermediate product contained in the exhaust gas into hydrogen chloride, the decomposition means is provided with a reactor packed with a transition metal or a transition metal silicide and means for heating the transition metal or transition metal silicide to a predetermined temperature;

detoxicating means for removing hydrogen chloride contained in the exhaust gas let out from the decomposition reaction means; and means for heating or maintaining an exhaust gas passage from the CVD system to the decomposition reaction means to or at a predetermined temperature.

5. The apparatus for treating an exhaust gas according to claim 4, wherein the exhaust gas passage is provided with hydrogen gas adding means for adding hydrogen gas to the exhaust gas.

* * * * *